Figure 1:
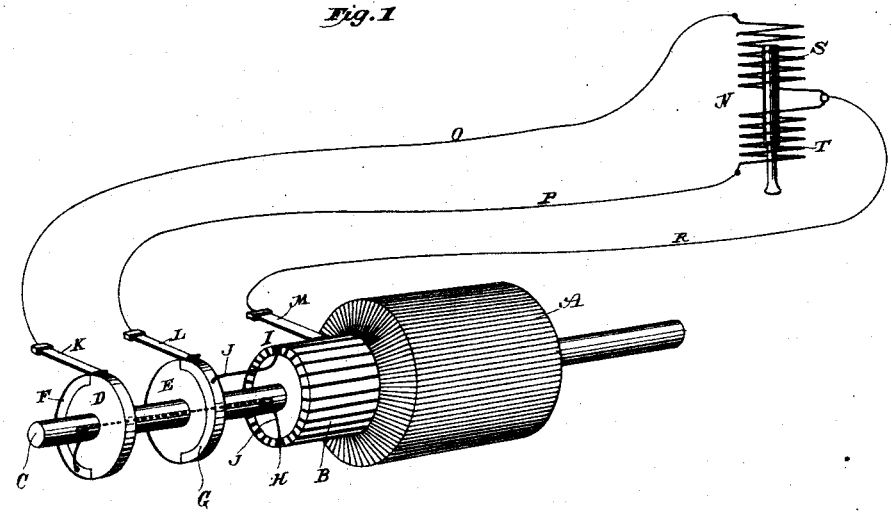

(No Model.)

H. N. MARVIN.
ELECTRIC DRILL SYSTEM.

No. 429,730. Patented June 10, 1890.

Witnesses:
Raphaël Netter
Ernest Hopkinson

Inventor:
Harry N. Marvin
by Duncan Curtis & Page
Attorneys.

UNITED STATES PATENT OFFICE.

HARRY N. MARVIN, OF SYRACUSE, NEW YORK.

ELECTRIC DRILL SYSTEM.

SPECIFICATION forming part of Letters Patent No. 429,730, dated June 10, 1890.

Application filed March 19, 1890. Serial No. 344,481. (No model.)

*To all whom it may concern:*

Be it known that I, HARRY N. MARVIN, a citizen of the United States, residing at Syracuse, in the county of Onondaga and State of New York, have invented certain new and useful Improvements in Electric Drill Systems, of which the following is a specification, reference being had to the drawings accompanying and forming a part of the same.

This invention relates to systems for electrically operating reciprocating tools, such as rock-drills; and the improvements, subject of this application, reside in a novel method of operating said drills and in the means of providing or furnishing to the drill coils or circuits the currents or current-impulses required for their proper operation. I have obtained certain patents for systems of this character in which one or more drills or similar tools are employed under the following general conditions: Each drill has two oppositely-acting coils included, respectively, in independent circuits, into which are delivered in alternation current impulses or alternations by a suitable generator or source of current.

The devices which I have previously shown and described were designed to supply currents of rising and falling potential; but my present invention involves a method of operating drills by directing alternately into the drill-coils currents the impressed electro-motive force of which is maximum at the start or beginning of each impulse, falling to the minimum at the termination or end of the same, whereby the maximum energy is applied at a time when the greatest proportion of work is to be done—that is, in reversing the direction of the core and starting it on its stroke, while the current falls off to zero at the time when the least energy is required and when the shifting of connection is made, thus avoiding spark.

The invention further involves a novel form or construction of generator by which I am enabled to make use of any ordinary continuous-current dynamo-machine, and by means of which current-impulses of different character from those heretofore employed are obtained.

In carrying out the invention I use an ordinary continuous-current machine having a given number of armature-coils joined together in series and each connected to a commutator-segment. On the shaft of such machine or on an extension thereof I secure insulating-disks, to the peripheries of which on opposite sides of the shaft are secured metal segments or plates extending over one hundred and eighty degrees or one-half of the entire periphery. These segments are connected, respectively, to diametrically-opposite commutator-segments, and brushes bearing on them are connected by suitable conductors to the two drill-coils. The opposite ends of the drill-coils are joined to a conductor leading to a single brush that bears on the commutator, and which is in such position with reference to the other brushes that when the segment or plate on one disk is just about to come in contact with its brush the commutator-segment to which said plate is connected will be one hundred and eighty degrees, or nearly so, from the point of contact between the commutator and the brush bearing thereon. It follows from this that currents are delivered in alternation to the two drill-coils, and that the impressed electro-motive force of such currents is at maximum at the beginning and falls to a minimum at the end of each impulse. This will be more clearly seen from the drawings.

Figure 2:
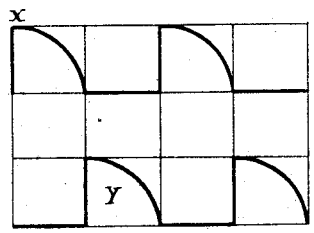

Figure 1 is a perspective view of a generator armature and commutator to which my improvements are applied, together with a diagram of the drill-circuits. Fig. 2 is a theoretical diagram illustrating the character of the currents delivered to the drill-coils.

A is a cylindrical or annular armature, wound with a continuous conductor connected at given intervals with the segments of a commutator B. The field-magnets, which for clearness of illustration are omitted from the drawings, are of the ordinary character.

On the shaft C are fixed two circular disks D E, of insulating material, carrying the half-rings or segmental plates of metal F G. These segments are connected, respectively, with two diametrically-opposite segments H I of the commutator B by any suitable conductors J. Brushes K L are caused to bear on the peripheries of these disks in such position that as one brush is leaving its segment the other is just coming into contact with the other.

A brush M bears on the commutator B and is placed in such relation to the brushes K L that when one of said brushes, as K, is just coming into contact with its metal plate F the brush M is just leaving the segment I with which plate G is connected, and is in consequence one hundred and eighty degrees from the segment H, connected with plate F. Brush K is connected to one coil S of the drill N by a conductor O. Brush L is connected to the other drill-coil T by a conductor P, and the opposite terminals of said coils are connected by a return-wire R to the brush M.

In the position of the parts shown in the drawings brush L is leaving its plate and brush K is just coming into contact with plate F. A maximum-impressed electro-motive force is therefore supplied to the coil S through conductors O and R, for the segment H is one hundred and eighty degrees from the segment, which at this moment is under the brush M.

During the next half-revolution of the armature the impressed electro-motive force falls to zero, becoming so when the plate G comes into contact with brush L, whereupon a maximum electro-motive force is supplied to drill-coil T through conductors P and R. It will be seen that the brushes K L leave their respective segments or plates at the moment of minimum current; hence there will be little or no sparking.

I make use of the term "impressed electro-motive force" to distinguish from the conditions that actually occur by reason of the counter electro-motive force and that due to the self-induction of the drill-coils. In the diagram Fig. 2 the curves X represent the impressed electro-motive force supplied to one set of coils and curves Y that supplied to the other coils or set of coils. The actual current-curves would not coincide exactly with these for the reasons above stated; but the practical result would be about the same, and the conditions of the impressed electro-motive force only need be considered.

The various ways in which the current produced by the generator may be utilized to excite its own field-magnets are obvious. The advantages of this special form of apparatus make it a desirable means of operating percussion-drills.

I do not claim, broadly, herein the plan or mechanism of operating a reciprocating tool by alternations or pulsations of current directed through its coils, the present invention being limited to the construction and arrangement of parts and the special method of operating the drills in the manner herein set forth.

What I claim is—

1. The method of operating reciprocating tools having oppositely-acting coils and a magnetic core, as herein set forth, which consists in supplying to said coils in alternation current-impulses and varying the impressed electro-motive force, producing such impulses from a maximum at the beginning to a minimum at the end of each impulse, as set forth.

2. The combination, with the continuously-wound armature and the commutator of a dynamo-electric machine, of collecting-segments each extending over one-half of a circle and connected, respectively, to diametrically-opposite segments of the commutator, brushes in position to make contact with said collecting-segments and connected with independent circuits, and a single brush bearing on the commutator and connected with the common return-wire for the said circuits, as set forth.

3. The combination, with the coils of a reciprocating tool or drill, of a continuous-current dynamo-electric machine, two semicircular contact-plates carried by the shaft and connected, respectively, to diametrically-opposite segments of the commutator, two brushes bearing on said plates and connected, respectively, with terminals of the drill-coils, and a third brush connected to the other terminals of said coils and bearing on the commutator, as set forth.

HARRY N. MARVIN.

Witnesses:
J. A. McFarran,
P. J. Ryan.